(12) United States Patent
Laemmle et al.

(10) Patent No.: US 10,650,952 B2
(45) Date of Patent: May 12, 2020

(54) INDUCTIVE CHARGING DEVICE

(71) Applicant: Mahle International GmbH, Stuttgart (DE)

(72) Inventors: Christopher Laemmle, Stuttgart (DE); Florin Moldovan, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 16/484,825

(22) PCT Filed: Feb. 8, 2018

(86) PCT No.: PCT/EP2018/053195
§ 371 (c)(1),
(2) Date: Aug. 8, 2019

(87) PCT Pub. No.: WO2018/146201
PCT Pub. Date: Aug. 16, 2018

(65) Prior Publication Data
US 2020/0027640 A1 Jan. 23, 2020

(30) Foreign Application Priority Data

Feb. 9, 2017 (DE) .......................... 10 2017 202 067

(51) Int. Cl.
*H01F 27/10* (2006.01)
*H02J 7/02* (2016.01)
(Continued)

(52) U.S. Cl.
CPC .............. *H01F 27/10* (2013.01); *B60L 53/12* (2019.02); *B60L 53/302* (2019.02);
(Continued)

(58) Field of Classification Search
CPC ........ H01F 27/10; H01F 27/365; H01F 38/14; B60L 53/12; B60L 53/302; H02J 7/025;
(Continued)

(56) References Cited

U.S. PATENT DOCUMENTS

| 5,684,380 A | 11/1997 | Woody et al. |
| 7,488,919 B2 * | 2/2009 | Gagas ..................... F24C 7/087 219/400 |

(Continued)

FOREIGN PATENT DOCUMENTS

| DE | 3501602 A1 | 7/1985 |
| DE | 102010021706 A1 | 12/2011 |

(Continued)

OTHER PUBLICATIONS

English abstract for DE-102010021706.
English abstract for DE-102013007851.

*Primary Examiner* — M Baye Diao
(74) *Attorney, Agent, or Firm* — Fishman Stewart PLLC

(57) ABSTRACT

An inductive charging device may include a charging assembly with at least one induction coil and at least one magnet plate, which may be ferrimagnetic or ferromagnetic at least on some regions, and an emission protection assembly fastened to the charging assembly, with a metal shielding plate, in order to shield field emissions arising during an inductive charging process. The emission protection assembly may have an active cooling assembly lying against the metal shielding plate so as to allow heat transfer and fastened thereto. The cooling assembly may have: at least one boundary insert lying against the metal shielding plate, by which a cooling region of the cooling assembly may be delimited; at least one channel structure insert lying against the metal shielding plate in the cooling region, through which a channel structure for a cooling medium may be provided; and a cooling cover, fastened to the boundary insert in a fluid-tight manner, in order to cover the cooling assembly.

20 Claims, 6 Drawing Sheets

(51) Int. Cl.
*H01F 38/14* (2006.01)
*H01F 27/36* (2006.01)
*B60L 53/12* (2019.01)
*B60L 53/302* (2019.01)
*H02J 50/10* (2016.01)

(52) U.S. Cl.
CPC ........... *H01F 27/365* (2013.01); *H01F 38/14* (2013.01); *H02J 7/025* (2013.01); *H02J 50/10* (2016.02); *B60Y 2200/91* (2013.01); *B60Y 2300/91* (2013.01)

(58) Field of Classification Search
CPC ... H02J 50/10; B60Y 2200/91; B60Y 2300/91
USPC ........................................................ 320/108
See application file for complete search history.

(56) References Cited

U.S. PATENT DOCUMENTS

| | | | |
|---|---|---|---|
| 9,991,046 B2 | 6/2018 | Blum et al. | |
| 10,447,065 B2 | 10/2019 | Hwang et al. | |
| 2009/0139781 A1* | 6/2009 | Straubel | B60L 50/64 180/65.1 |
| 2011/0285349 A1 | 11/2011 | Widmer et al. | |
| 2014/0257614 A1* | 9/2014 | Niizuma | B60L 53/30 701/22 |
| 2017/0259677 A1 | 9/2017 | Stewing et al. | |

FOREIGN PATENT DOCUMENTS

| | | |
|---|---|---|
| DE | 102013007851 A1 | 11/2014 |
| DE | 102014204517 A1 | 9/2015 |
| DE | 102014218067 A1 | 3/2016 |
| EP | 0680055 A1 | 11/1995 |
| EP | 0823767 A1 | 2/1998 |
| EP | 2515314 A1 | 10/2012 |
| GB | 2153597 A | 8/1985 |
| GB | 2529630 A | 3/2016 |
| WO | 2017/014430 A1 | 1/2017 |

* cited by examiner

INDUCTIVE CHARGING DEVICE

CROSS-REFERENCE TO RELATED APPLICATION

This application claims priority to International Patent Application No. PCT/EP2018/053195, filed on Feb. 8, 2018 and German Patent Application No. 10 2017 202 067.9 filed Feb. 9, 2017, the contents of both of which are hereby incorporated by reference in their entirety.

TECHNICAL FIELD

The invention relates to an inductive charging device for an electrically operated motor vehicle. The inductive charging devices can be used for the contactless transfer of the energy from an external source to an energy store in the motor vehicle or directly in electric consumers or in a drive.

BACKGROUND

The inductive charging device has here a charging assembly with at least one secondary coil, wherein through a coupling of the secondary coil with a primary coil, the energy store of the motor vehicle is able to be charged. The secondary coil can, for example, be fastened to a motor vehicle floor, so that by the starting of a charging site which is level with the floor or is vertically adjustable, the secondary coil can be coupled with the primary coil. The primary coil and the secondary coil can be configured here for example in the form of a spiral flat coil or double-D coil.

In the charging process, an electric and a magnetic field are built up between the secondary coil and the primary coil, which enable an energy transfer from the source, which is connected in an electrically conducting manner with the primary coil, to the energy store, which is connected in an electrically conducting manner with the secondary coil. Through a magnet plate which is ferrimagnetic or ferromagnetic at least in some regions—for example with soft magnetic ferrites—in the charging assembly, the course of the magnetic and of the electric field can be influenced, in order to reduce the charging losses.

In the charging process, magnetic and electric field emissions occur, the extent of which increases with the charging power. The field emissions are shielded, so as not to damage electronic equipment in the motor vehicle and to preclude effects on a person's health. For the shielding of the field emissions, the inductive charging device has an emission protection assembly with a metal shielding plate—for example made of aluminium—which can intercept the field emissions during the charging process. Such inductive charging devices are known for example from EP 2 515 314 A1.

With the increasing charging power, the amount of heat arising on the magnet plate and on the metal shielding plate also increases, which is to be emitted to the environment. In the case of a high charging power, the heat can only be partially dissipated, which can lead to an overheating of the inductive charging device and to its being damaged. In order to enlarge the heat-emitting surface of the metal shielding plate, the dimensions of the metal shielding plate and consequently the structural volume and the weight of the inductive charging device are increased.

SUMMARY

The object of the invention is therefore to provide an inductive charging device in which a higher charging power becomes possible and a damage to the induction device by overheating is prevented.

This problem is solved according to the invention by the subject of the independent claim 1. Advantageous embodiments are the subject of the dependent claims.

The present invention is based on the general idea that the emission protection assembly has an active cooling assembly which is fastened to the metal shielding plate so as to allow heat transfer. Through the active cooling assembly, the heat arising at the inductive charging device is actively dissipated, so that an overheating of the inductive charging device is prevented and the charging power and the efficiency of the inductive charging device can be increased. Through the higher charging power, consequently also the charging time of the energy store can be reduced.

The active cooling assembly can be, for example, a liquid cooling, in which a liquid cooling medium—for example water, coolant or oil—is directed through the cooling assembly and takes off the heat arising at the metal shielding plate. The heated cooling medium can be transported by a pump to a radiator, in which the heat can be subsequently emitted to the environment.

In an advantageous further development of the solution according to the invention, provision is made that the cooling assembly has at least one channel structure insert lying against the metal shielding plate, through which a channel structure is provided for the cooling medium. The channel structure provided through the channel structure insert enables a longer contact of the cooling medium with the metal shielding plate, so that a higher quantity of heat can be emitted to the cooling medium and consequently can be dissipated from the metal shielding plate.

The cooling assembly can also have several channel structure inserts, which are arranged adjacent to one another lying against the metal shielding plate. Here, the channel structure of the individual channel structure inserts can be identical or can be different from one another. Thereby, the flow speed and the flow volume of the cooling medium, and consequently the heat transfer behaviour, can be adapted in individual regions of the metal shielding plate.

The channel structure can also be configured in such a way that the cooling medium has a turbulent flow through the channel structure insert. With the turbulent flow, the heat transfer between a still cooled part of the cooling medium and an already heated part of the cooling medium within the channel structure insert is more intensive, so that as a whole the heat transfer behaviour of the cooling assembly can be influenced in a positive manner.

Advantageously, in a further development of the solution according to the invention, provision is made that the cooling assembly has at least two channel structure inserts, which lie on one another at least in some regions and form at least one insert stack arranged adjacently on the metal shielding plate. The channel structure inserts, lying on one another, can have here identical or different channel structure, in order to influence the flow behaviour of the cooling medium in the cooling assembly. Thus, thereby for example the turbulent flow in the cooling medium can be assisted and the flow speed and the flow volume of the cooling medium can be adapted.

In a further development of the inductive charging device according to the invention, provision is made that the channel structures of the channel structure inserts, lying adjacent to one another, have a lateral displacement with respect to one another. Alternatively or additionally, the channel structures of the channel structure inserts, lying on one another, can also have a lateral displacement to one another in the insert stack. Through a lateral displacement of the channel structure inserts with respect to one another, a turbulent flow is assisted in the cooling medium, so that the heat transfer between the cooling assembly and the metal shielding plate is increased.

Advantageously, provision is made that the channel structure inserts lying adjacent to one another and/or the channel structure inserts lying on one another in the insert stack can have a lateral displacement with respect to one another. The lateral displacement of the channel structure inserts with an identical channel structure with respect to one another can assist the turbulent flow in the cooling medium, and can increase the heat transfer between the cooling assembly and the metal shielding plate.

In a further development of the solution according to the invention, provision is made that the cooling assembly has at least one boundary insert lying against the metal shielding plate, by which a cooling region of the cooling assembly is delimited. The boundary insert can be configured, for example, in the form of a circumferential edge, which is fastened to the metal shielding plate in a fluid-tight manner by a materially bonded connection—for example by soldering.

One or more channel structure inserts are arranged within the boundary insert and the cooling medium can only flow in the cooling region delimited by the boundary insert. At the boundary insert, an inlet and an outlet can be provided for the cooling medium, through which the cooling medium is directed into the cooling assembly and is directed out from the cooling assembly.

In a further development of the boundary insert, provision is made that the channel structure insert is formed integrally on the boundary insert. Thus, the channel structure insert and the boundary insert can be produced for example from aluminium in one manufacturing step, so that the production costs can be reduced. Advantageously here the rigidity of the boundary insert and of the channel structure insert can be increased, so that structural faults as a result of an undesired deformation of the boundary insert or of the channel structure insert can be prevented.

In a further development of the inductive charging device according to the invention, provision is made that the cooling assembly has a tube cooling body with at least one coolant tube and with at least one coolant collector. The coolant tube with the cooling medium is arranged lying against the metal shielding plate and exchanges the heat with the metal shielding plate. Thereby, the heat arising at the inductive charging device is dissipated, so that an overheating of the inductive charging device can be prevented.

Advantageously, provision is made that the cooling assembly has a cooling cover. The cooling cover can be fastened here in a fluid-tight manner for example on the boundary insert or directly on the metal shielding plate, in order to prevent the cooling medium from running out from the cooling assembly. In the case of the tube cooling body, the cooling cover can be fastened to the metal shielding plate, in order to be able to protect the tube cooling body from external influences. So that the cooling medium can be directed into the cooling assembly and can be directed out from the cooling assembly, an inlet and an outlet can be provided on the cooling cover.

In a further development of the inductive charging device according to the invention, provision is made that the cooling assembly has a channel structure plate, which has the channel structure on an inner side facing the metal shielding plate. The channel structure can be formed for example by several punctiform or linear shapings formed integrally on the channel structure plate. In order to assist a turbulent flow of the cooling medium through the channel structure, the shapings can be arranged in an irregular pattern on the inner side. Alternatively or additionally, the channel structure can be formed by meandering shapings on the inner side of the channel structure plate.

The channel structure plate can be produced for example from aluminium in a deep-drawing method or in a milling method. The rigidity of the channel structure plate can be influenced in a targeted manner by the channel structure, in order to facilitate the handling of the channel structure plate and to prevent structural faults as a result of an undesired deformation of the channel structure plate. An inlet and an outlet can also be provided on the channel structure plate, in order to be able to direct the cooling medium into the cooling assembly and to direct it out from the cooling assembly.

In order to increase the heat emission from the charging assembly to the emission protection assembly, provision is made in an advantageous further development of the inductive charging device according to the invention that the inductive charging device has a heat conduction insert fastened between the emission protection assembly and the charging assembly. The heat conduction insert can be produced from a heat-conducting material, such as for example heat-conducting pastes, filling ceramics or polymer materials. The heat conduction insert connects the emission protection assembly and the charging assembly without an air gap, whereby the heat conduction between the emission protection assembly and the charging assembly is increased.

Advantageously, provision is made that the emission protection assembly is shaped so as to be substantially flat, in order to reduce the structural volume of the emission protection device. A reduction of the structural volume can be relevant in particular in the case of the inductive charging device for a motor vehicle.

Alternatively, the emission protection assembly may not be shaped so as to be flat and may follow substantially a three-dimensional surface. The shape of the emission protection assembly can therefore be adapted for example to a vehicle floor, in order to reduce the structural volume in a motor vehicle. A protective edge arranged around the charging assembly can also be provided on the emission protection assembly, in order to be able to shield the field emissions laterally.

In a further development of the inductive charging device according to the invention, provision is made that the inductive charging device has a power electronics unit for controlling the inductive charging device. The power electronics is provided for the transfer of the electrical energy and can also generate heat in a charging process.

In order to be able to cool the power electronics unit actively with the cooling assembly, provision is advantageously made that the power electronics unit is fastened to the emission protection assembly on an underside facing the charging assembly or on an upper side facing away from the charging assembly. The heat generated by the power electronics unit can be dissipated through the cooling assembly, so that an overheating of the power electronics unit is prevented.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
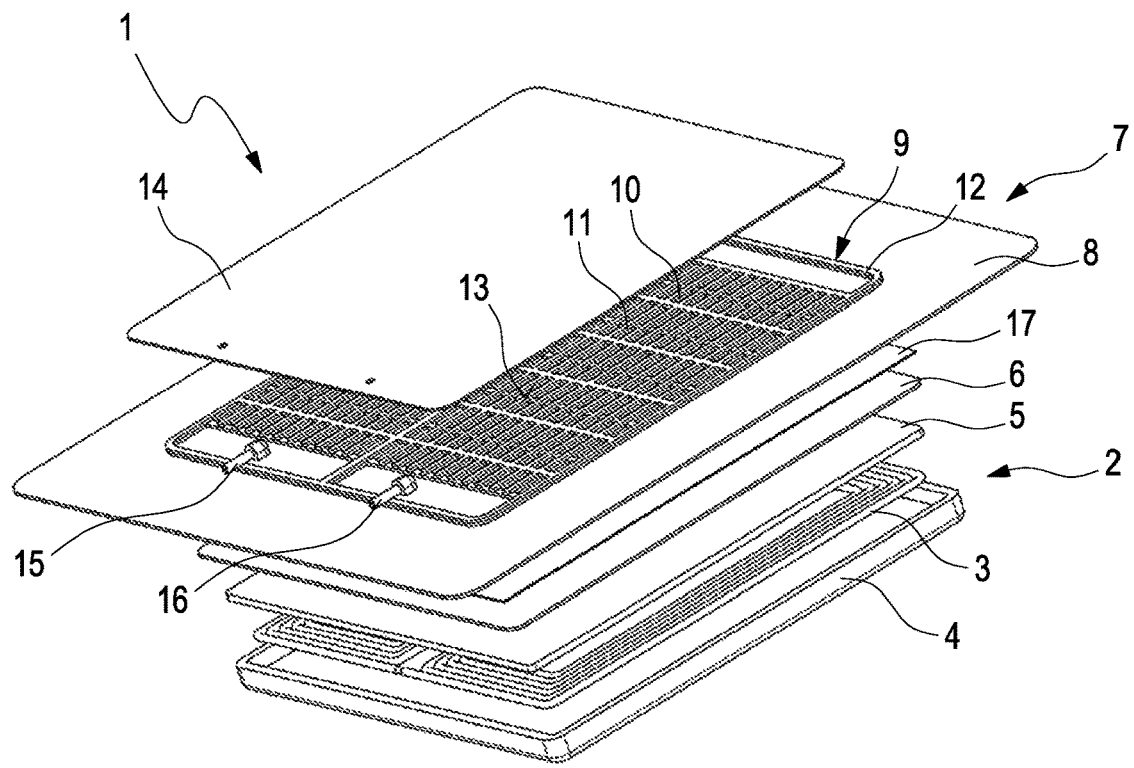
FIG. 1 an exploded view of an inductive charging device with a boundary insert and with channel structural inserts formed integrally on the boundary insert.
Figure 2:
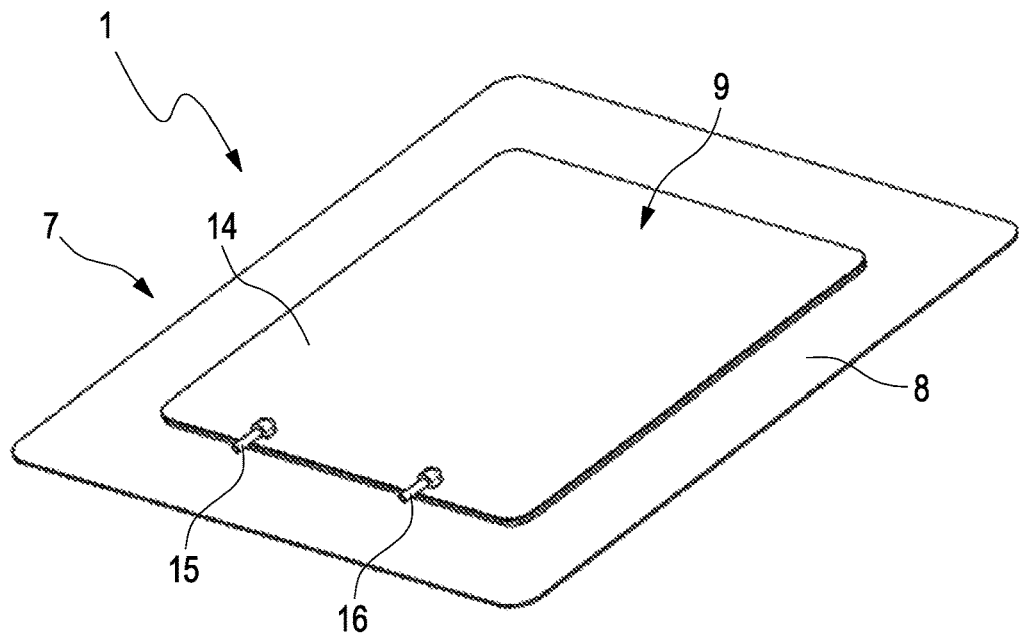
FIG. 2 a view of the assembled inductive charging device illustrated in FIG. 1.

FIG. 1 shows an exploded view of an inductive charging device 1 for an electrically operated motor vehicle. In FIG. 2 a view is shown of the assembled inductive charging device 1 illustrated in FIG. 1. The inductive charging device 1 has a charging assembly 2 with two induction coils 3, which are arranged in a coil housing 4. A magnet plate 5, which is ferrimagnetic or ferromagnetic at least in some regions, is arranged on the induction coils 3 and can influence the course of the magnetic and the electric field. A coil cover 6 covers the charging assembly 2.

On the charging assembly 2 an emission protection assembly 7 with a metal shielding plate 8, made of aluminium for example, is arranged, which can shield field emissions arising during an inductive charging process. In this example embodiment, the emission protection assembly 7 is shaped so as to be substantially flat. The emission protection assembly 7 can, however, alternatively follow a three-dimensional surface, in order for example to be able to shield the field emissions laterally from the charging assembly 2.

The emission protection assembly 7 has an active cooling assembly 9 fastened to the metal shielding plate 8 so as to allow heat transfer. Through the active cooling assembly 9, the heat arising at the inductive charging device 1 is dissipated actively, so that an overheating of the inductive charging device 1 is prevented, and consequently the charging power of the inductive charging device 1 can be increased.

The cooling assembly 9 has two channel structure inserts 10 lying against the metal shielding plate 8, by which a channel structure 11 is provided for a cooling medium—for example water or coolant. The cooling medium is directed through the channel structure 11 and takes off the heat arising at the metal shielding plate 8. Through the channel structure 11, a turbulent flow through the channel structure inserts 10 is assisted, so that the heat exchange between the cooling medium and the metal shielding plate 8 is increased.

The cooling assembly 9 has, furthermore, a boundary insert 12 lying against the metal shielding plate 8, which boundary insert delimits a cooling region 13 of the cooling assembly 9 with the channel structure inserts 10 lying on the interior. The boundary insert 12 is fastened to the metal shielding plate 8 in a fluid-tight manner for example by a materially bonded connection.

In this example embodiment, the channel structure inserts 10 are formed integrally on the boundary insert 12. Thereby, the rigidity of the boundary insert 12 and of the channel structure inserts 10 can be increased, so that structural faults as a result of an undesired deformation of the boundary insert 12 or of the channel structure insert 10 are prevented.

In order to prevent the cooling medium from running out of the cooling assembly 9, the cooling assembly 9 has a cooling cover 14. The cooling cover 14 is fastened on the boundary insert 12 in a fluid-tight manner and has an inlet 15 and an outlet 16 for the cooling medium.

In order to increase the heat emission of the charging assembly 2 to the emission protection assembly 7, the inductive charging device 1 has a heat conduction insert 17 fastened between the emission protection assembly 7 and the charging assembly 2.

Figure 3:
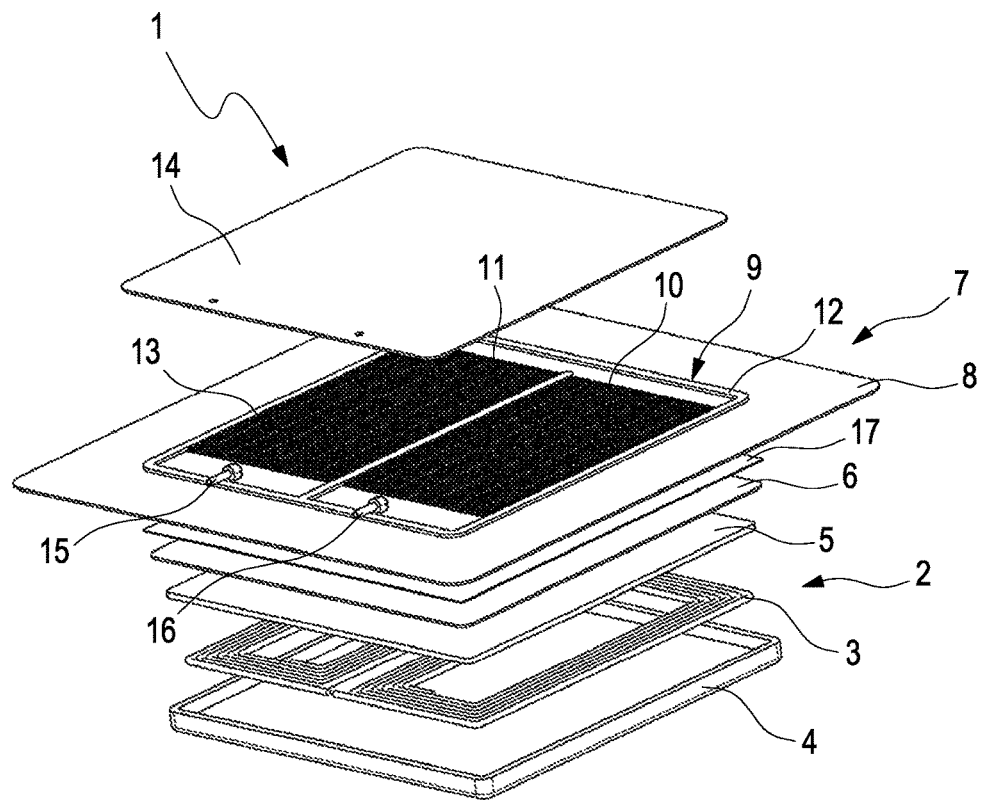
FIG. 3 an exploded view of an inductive charging device with a boundary insert and with channel structure inserts.
Figure 4:
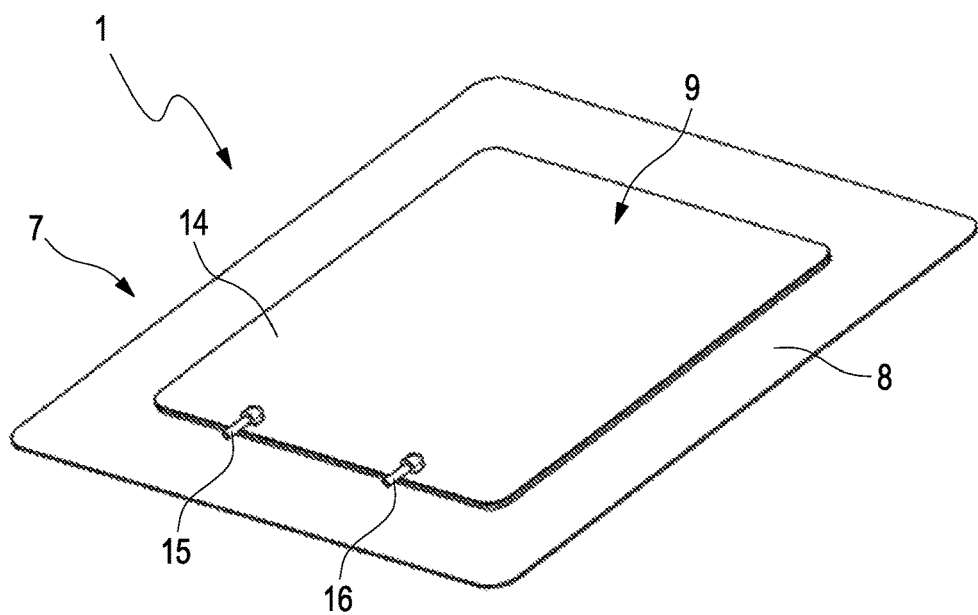
FIG. 4 a view of the assembled inductive charging device illustrated in FIG. 3.

FIG. 3 shows an exploded view of the inductive charging device 1 with the boundary insert 12 and with the channel structure inserts 10. In FIG. 4 a view is shown of the assembled inductive charging device 1 which is illustrated in FIG. 3. Here, the channel structure inserts 10 are separated by the boundary insert 12, so that the manufacturing material of the channel structure inserts 10 and the manufacturing material of the boundary insert 12 can be different. Therefore, the boundary insert 12 can be produced for example from aluminium and the channel structure insert 10 from a polymer material or from a metal.

Figure 5:
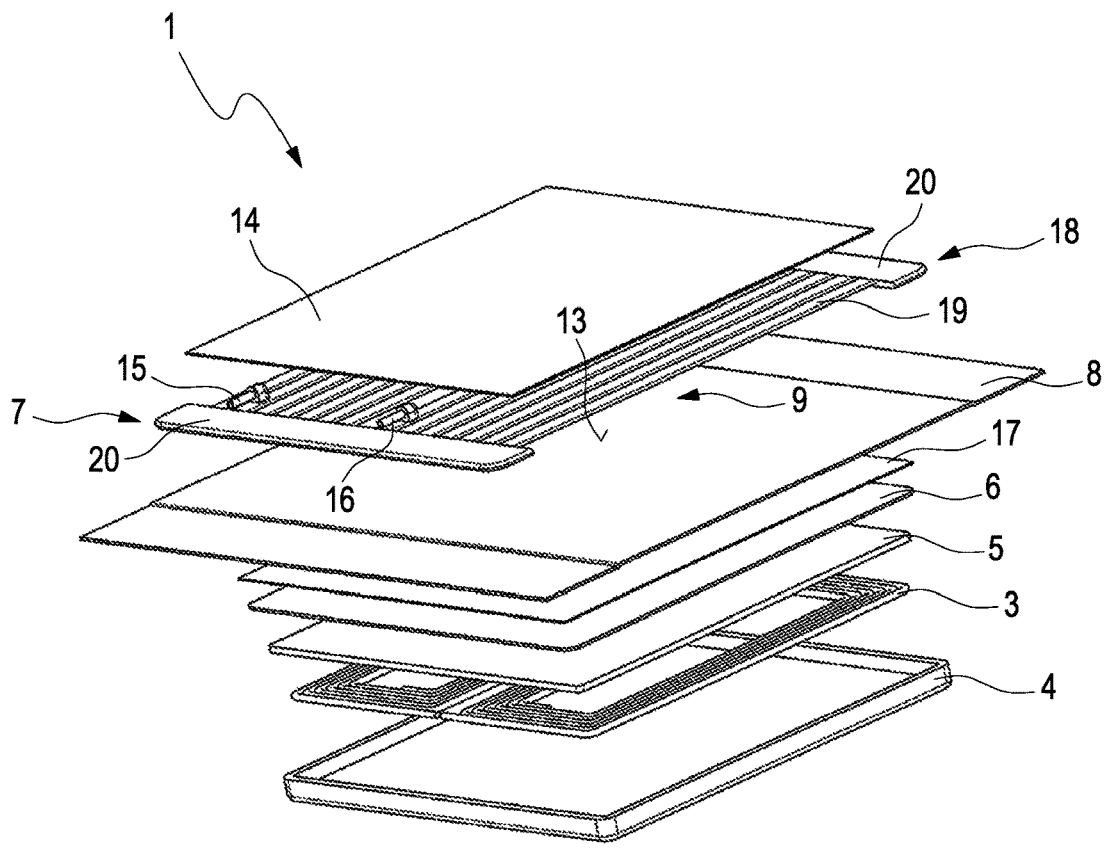
FIG. 5 an exploded view of an inductive charging device with a tube cooling body.
Figure 6:
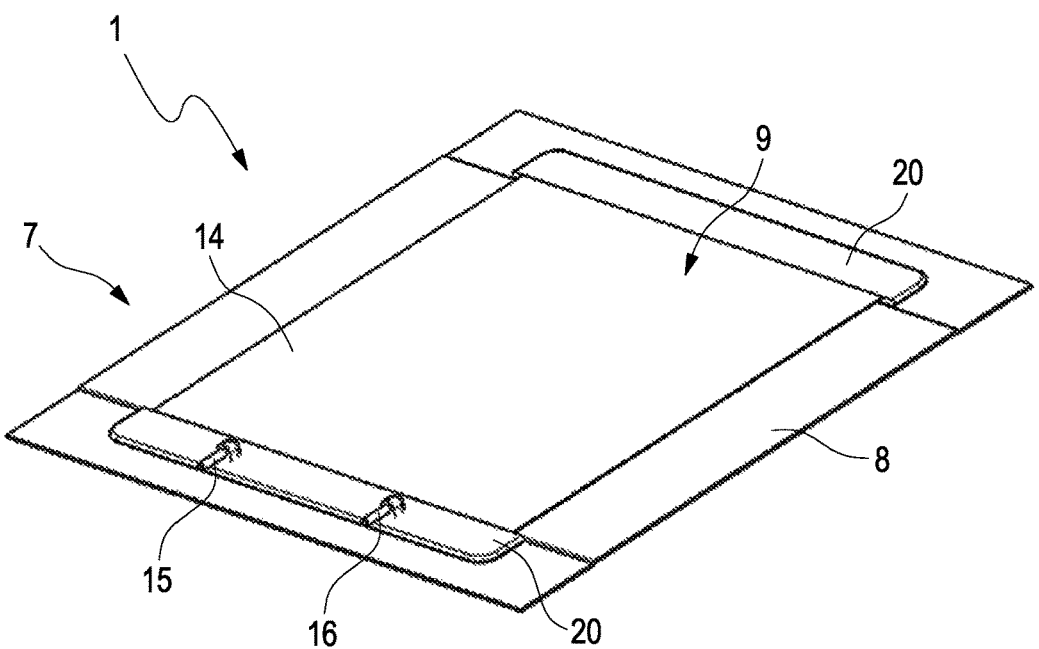
FIG. 6 a view of the assembled inductive charging device illustrated in FIG. 5.

FIG. 5 shows an exploded view of the inductive charging device 1 with a tube cooling body 18. In FIG. 6 a view is shown of the assembled inductive charging device 1 which is illustrated in FIG. 5. The tube cooling body 18 has several coolant tubes 19 and a coolant collector 20. The coolant tubes 19, filled with the cooling medium, are arranged lying against the metal shielding plate 8 and exchange the heat with the metal shielding plate 8. Thereby, the heat arising at the inductive charging device 1 is dissipated, so that an overheating of the inductive charging device 1 can be prevented. The cooling cover 14 is fastened to the metal shielding plate 8 and protects the tube cooling body 18 from external influences.

Figure 7:
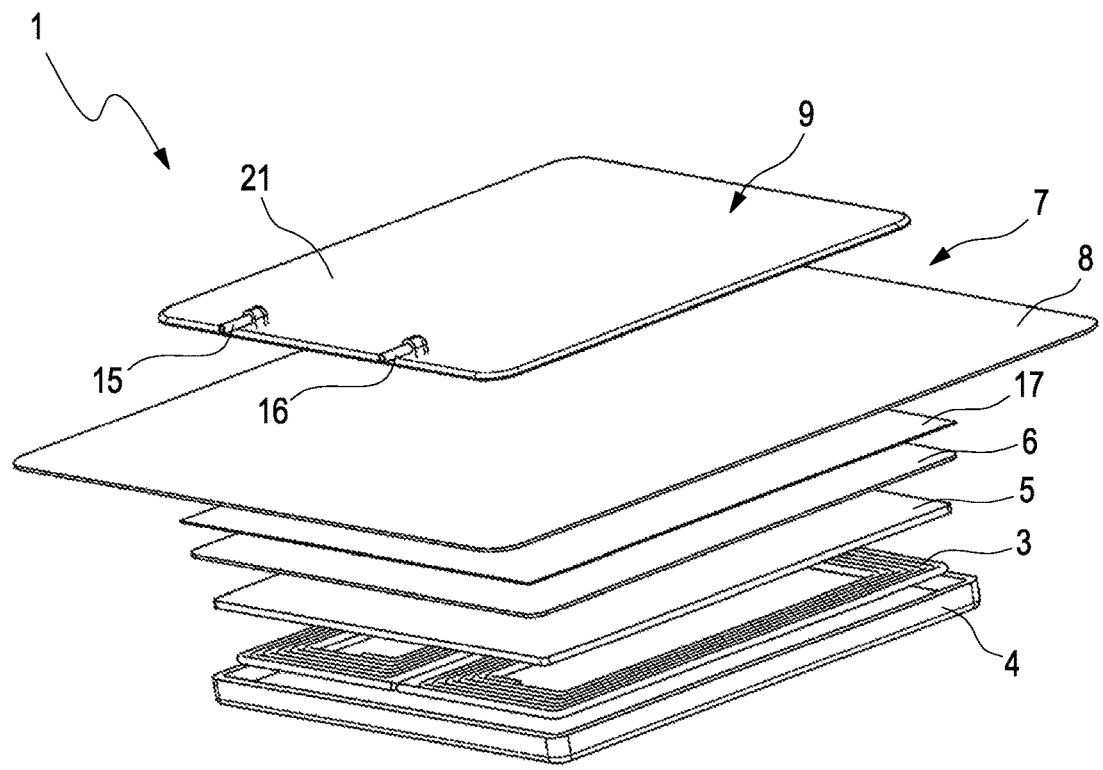
FIG. 7 an exploded view of an inductive charging device with a channel structure plate, shown from above.
Figure 8:
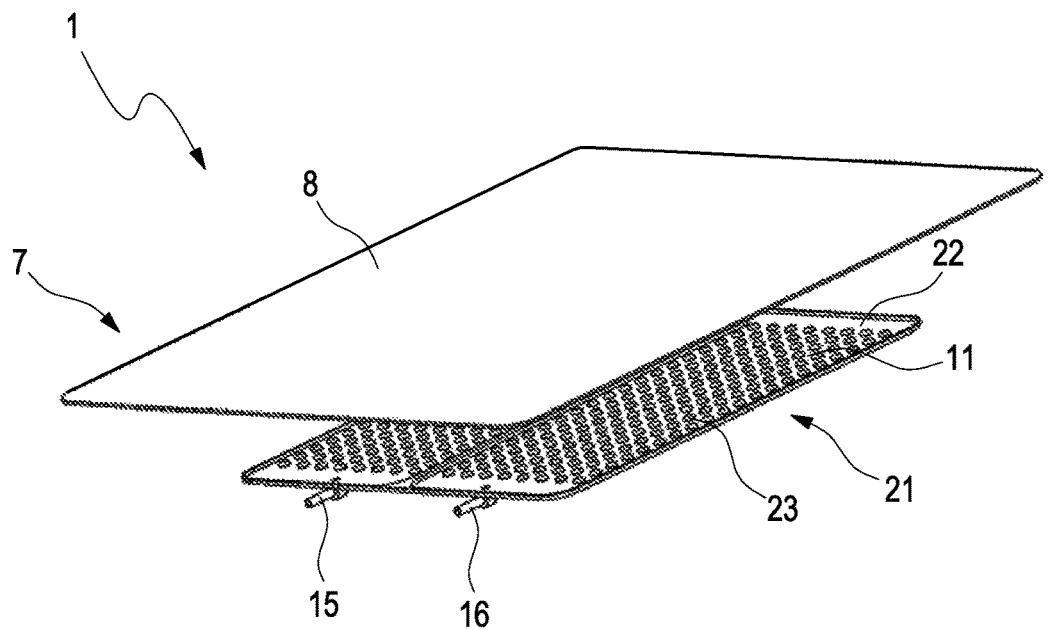
FIG. 8 an exploded view of the inductive charging device illustrated in FIG. 7, shown from below.

FIG. 7 shows an exploded view from above of the inductive charging device 1 with a channel structure plate 21. In FIG. 8 an exploded view from below is shown of the inductive charging device 1 which is illustrated in FIG. 7. The channel structure plate 21 has the channel structure 11 on an inner side 22 facing the metal shielding plate 8. In this example embodiment, the channel structure 11 is formed by several punctiform shapings 23 formed integrally on the channel structure plate 21. The shapings 23 are arranged in a regular pattern on the channel structure plate 21. Alternatively, the shapings 23 can be arranged in an irregular pattern on the channel structure plate 21, in order to assist a turbulent flow of the cooling medium through the channel structure 11 of the channel structure plate 21.

The channel structure plate 21 can be produced for example from aluminium in a deep-drawing method or in a milling method. The rigidity of the channel structure plate 21 can be influenced in a targeted manner by the shape of the channel structure 11.

In this example embodiment, no cooling cover 14 is provided. The channel structure plate 21 is fastened to the metal shielding plate 8 in a fluid-tight manner and the cooling medium is limited by the channel structure plate 21 in the cooling region 13. The inlet 15 and the outlet 16 are arranged on the channel structure plate 21.

Figure 9:
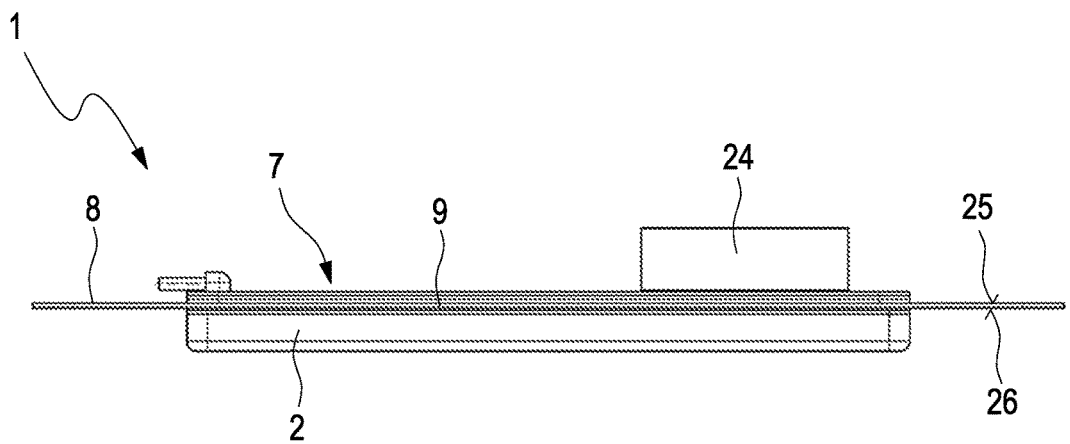
FIG. 9 a side view of an inductive charging device with a power electronics unit, which is arranged on an upper side of an emission protection assembly, facing away from the charging assembly.
Figure 10:
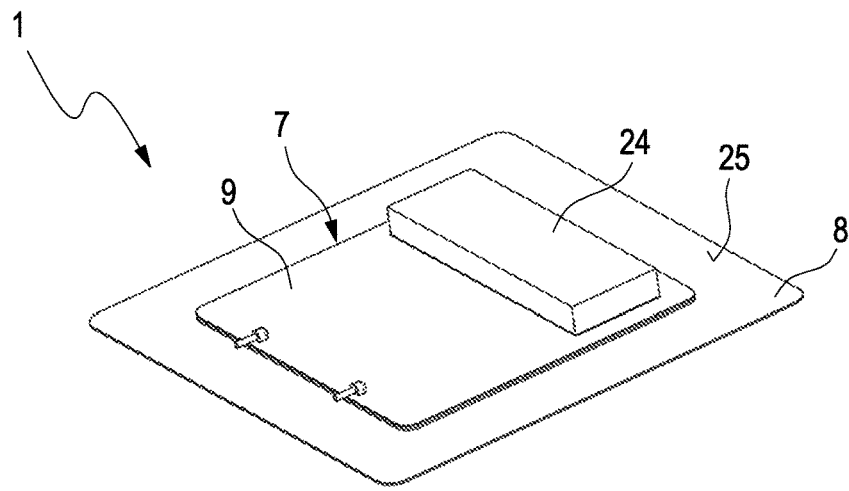
FIG. 10 a view of the inductive charging device illustrated in FIG. 9, shown from above.
Figure 11:
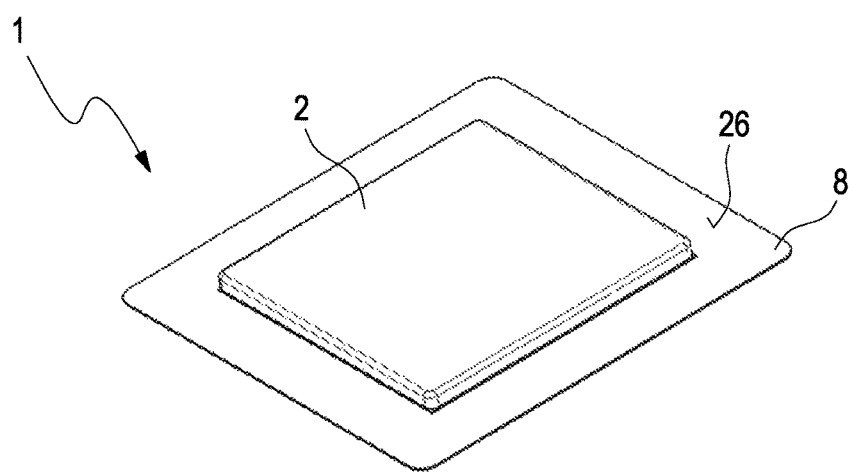
FIG. 11 a view of the inductive charging device illustrated in FIG. 9, shown from below.

FIG. 9 shows a side view of the inductive charging device 1 with a power electronics unit 24. In FIG. 10 the inductive charging device 1 which is illustrated in FIG. 9 is shown from above, and in FIG. 11 from below. The power electronics in the power electronics unit 24 is provided for the transfer of the electrical energy and, in a charging process, can also generate heat. In this example embodiment, in order to cool the power electronics unit 24, the power electronics unit 24 can be arranged on an upper side 25 of the emission protection assembly 7 facing away from the charging assembly 2. Thus, the heat arising at the power electronics unit 24 can be dissipated by the cooling assembly 9 of the emission protection assembly 7 and an overheating of the power electronics unit 24 can be prevented.

Figure 12:
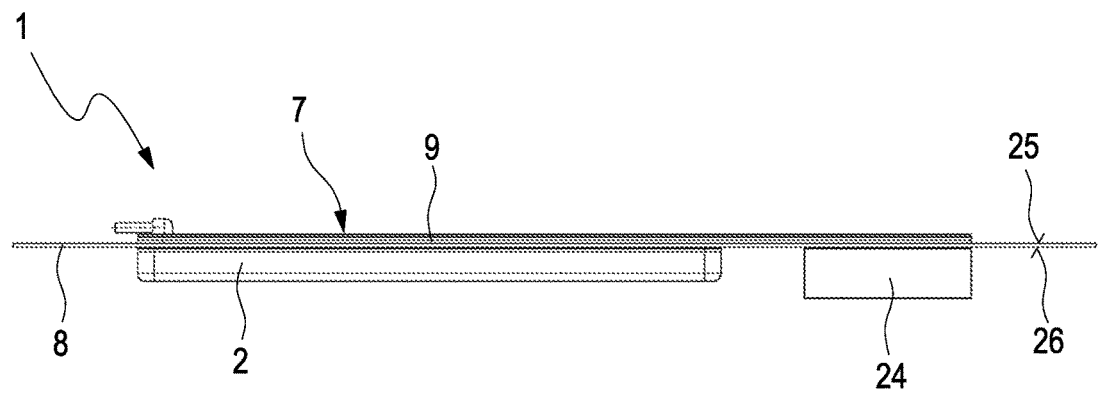
FIG. 12 a side view of an inductive charging device with a power electronics unit, which is arranged on an upper side of an emission protection assembly, facing the charging assembly.
Figure 13:
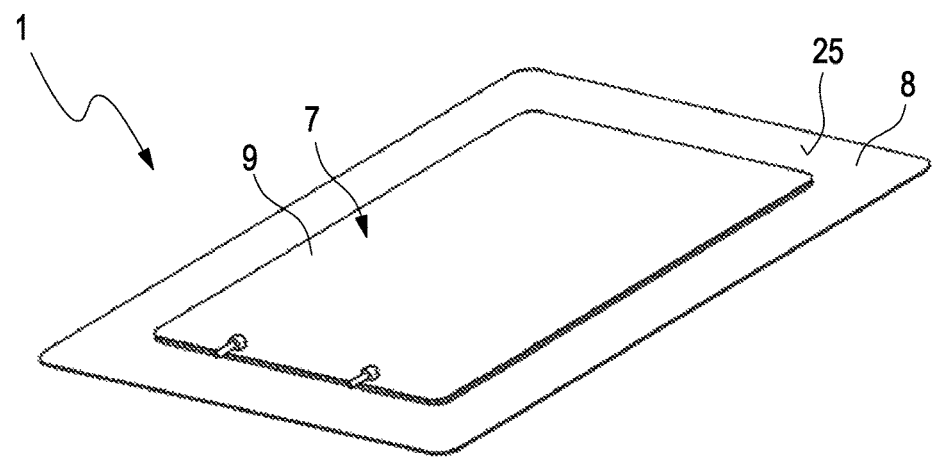
FIG. 13 a view of the inductive charging device illustrated in FIG. 12, shown from above.
Figure 14:
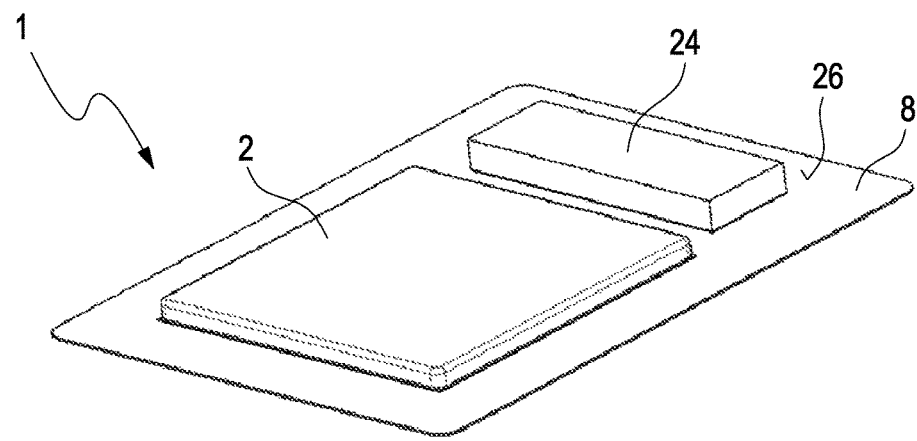
FIG. 14 a view of the inductive charging device illustrated in FIG. 12, shown from below.

FIG. 12 shows a side view of an inductive charging device 1 with the power electronics unit 24. In FIG. 13, the inductive charging device 1, which is illustrated in FIG. 12, is shown from above, and in FIG. 14 from below. In this example embodiment, the power electronics unit 24 is arranged on an underside 26 of the emission protection assembly 7 facing the charging assembly 7. Also in this example embodiment the heat arising at the power electronics unit 24 can be dissipated by the cooling assembly 9 of the emission protection assembly 7, in order to prevent an overheating of the power electronics unit 24.

The invention claimed is:

1. An inductive charging device for an electrically operated motor vehicle, comprising:
   a charging assembly with at least one induction coil and at least one magnet plate, which is ferrimagnetic or ferromagnetic at least on some regions; and
   an emission protection assembly fastened to the charging assembly, with a metal shielding plate, in order to shield field emissions arising during an inductive charging process;
   wherein the emission protection assembly has an active cooling assembly lying against the metal shielding plate so as to allow heat transfer and fastened thereto;
   wherein the cooling assembly has at least one boundary insert lying against the metal shielding plate, by which a cooling region of the cooling assembly is delimited;
   wherein the cooling assembly has at least one channel structure insert lying against the metal shielding plate in the cooling region, through which a channel structure for a cooling medium is provided; and
   wherein the cooling assembly has a cooling cover, fastened to the boundary insert in a fluid-tight manner, in order to cover the cooling assembly.

2. The inductive charging device according to claim 1, wherein the cooling assembly has at least two channel structure inserts, which lie on one another at least in some regions, and form at least one insert stack arranged adjacently on the metal shielding plate.

3. The inductive charging device according to claim 2, wherein the channel structures of the at least two channel structure inserts at least one of lying adjacent to one another and lying on one another in the insert stack have a lateral displacement with respect to one another, in order to generate a turbulent flow of the cooling medium in the cooling assembly.

4. The inductive charging device according to claim 2, wherein the at least two channel structure inserts at least one of lying adjacent to one another and lying on one another in the insert stack have a lateral displacement with respect to one another, in order to generate a turbulent flow of the cooling medium in the cooling assembly.

5. The inductive charging device according to claim 1, wherein the at least one channel structure insert is formed integrally on the boundary insert.

6. The inductive charging device according to claim 1, further comprising a heat conduction insert fastened between the emission protection assembly and the charging assembly, in order to increase the heat emission of the charging assembly to the emission protection assembly.

7. The inductive charging device according to claim 1, wherein the emission protection assembly is shaped so as to be substantially flat or follows substantially a three-dimensional surface.

8. The inductive charging device according to claim 1, further comprising a power electronics unit for controlling the inductive charging device.

9. The inductive charging device according to claim 8, wherein the power electronics unit is fastened to the emission protection assembly on one of an underside facing the charging assembly or an upper side facing away from the charging assembly, in order to be able to cool the power electronics unit with the cooling assembly.

10. The inductive charging device according to claim 2, further comprising a power electronics unit for controlling the inductive charging device.

11. The inductive charging device according to claim 10, wherein the power electronics unit is fastened to the emission protection assembly on an underside facing the charging assembly, in order to be able to cool the power electronics unit with the cooling assembly.

12. The inductive charging device according to claim 10, wherein the power electronics unit is fastened to the emission protection assembly on an upper side facing away from the charging assembly, in order to be able to cool the power electronics unit with the cooling assembly.

13. The inductive charging device according to claim 2, wherein the at least one channel structure insert is formed integrally on the boundary insert.

14. The inductive charging device according to claim 2, further comprising a heat conduction insert fastened between the emission protection assembly and the charging assembly, in order to increase the heat emission of the charging assembly to the emission protection assembly.

15. The inductive charging device according to claim 2, wherein the emission protection assembly is shaped so as to be substantially flat or follows substantially a three-dimensional surface.

16. An inductive charging device for an electrically operated motor vehicle, comprising:
- a charging assembly with at least one induction coil and at least one magnet plate, which is ferrimagnetic or ferromagnetic at least on some regions; and
- an emission protection assembly fastened to the charging assembly, with a metal shielding plate, in order to shield field emissions arising during an inductive charging process;
- wherein the emission protection assembly has an active cooling assembly lying against the metal shielding plate so as to allow heat transfer and fastened thereto;
- wherein the cooling assembly has at least one boundary insert lying against the metal shielding plate, by which a cooling region of the cooling assembly is delimited;
- wherein the cooling assembly has at least two channel structure inserts lying against the metal shielding plate in the cooling region, through which a channel structure for a cooling medium is provided, the at least two channel structure inserts lying on one another at least in some regions, and forming at least one insert stack arranged adjacently on the metal shielding plate;
- wherein at least one of:
  - the channel structures have a lateral displacement with respect to one another; and
  - the at least two channel structure inserts have a lateral displacement with respect to one another; and
- wherein the cooling assembly has a cooling cover, fastened to the boundary insert in a fluid-tight manner, in order to cover the cooling assembly.

17. The inductive charging device according to claim 16, wherein the at least one channel structure insert is formed integrally on the boundary insert.

18. The inductive charging device according to claim 16, further comprising a heat conduction insert fastened between the emission protection assembly and the charging assembly, in order to increase the heat emission of the charging assembly to the emission protection assembly.

19. The inductive charging device according to claim 16, wherein the emission protection assembly is shaped so as to be substantially flat or follows substantially a three-dimensional surface.

20. The inductive charging device according to claim 16, further comprising a power electronics unit for controlling the inductive charging device.

\* \* \* \* \*